United States Patent
Specht et al.

(10) Patent No.: US 6,736,424 B2
(45) Date of Patent: May 18, 2004

(54) AIRBAG SYSTEM FOR A MOTOR VEHICLE

(75) Inventors: Martin Specht, Feldafing (DE); Thomas Heckmayr, Rammingen (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 47 days.

(21) Appl. No.: 10/135,535

(22) Filed: May 1, 2002

(65) Prior Publication Data

US 2003/0052479 A1 Mar. 20, 2003

(30) Foreign Application Priority Data

Sep. 14, 2001 (DE) .......................... 101 45 524

(51) Int. Cl.$^7$ .............................................. B60R 21/32
(52) U.S. Cl. ..................... 280/735; 280/729; 280/733; 280/743.1; 200/61.45 M; 340/438; 340/436; 701/1; 701/45; 701/47; 73/31.04
(58) Field of Search .................. 280/735, 733, 280/729, 743.1; 701/1, 45, 47; 73/31.04; 340/438, 436; 200/61.45 M

(56) References Cited

U.S. PATENT DOCUMENTS

| | | | | |
|---|---|---|---|---|
| 3,750,100 A | * | 7/1973 | Ueda ........................ 340/436 |
| 5,007,661 A | * | 4/1991 | Lenzen ..................... 280/735 |
| 5,065,322 A | * | 11/1991 | Mazur et al. ................. 701/47 |
| 5,185,701 A | * | 2/1993 | Blackburn et al. ............ 701/45 |
| 5,187,465 A | * | 2/1993 | Stonerook et al. ......... 340/438 |
| 5,280,953 A | * | 1/1994 | Wolanin et al. ............ 280/739 |
| 5,282,646 A | * | 2/1994 | Melvin et al. .............. 280/729 |
| 5,293,153 A | * | 3/1994 | Rochette et al. ........... 340/438 |
| 5,413,378 A | * | 5/1995 | Steffens et al. ............. 280/735 |
| 5,496,979 A | * | 3/1996 | Behr ................... 200/61.45 M |
| 5,608,629 A | * | 3/1997 | Cuddihy et al. ................ 701/1 |
| 5,794,971 A | * | 8/1998 | Boydston et al. ........... 280/733 |
| 5,826,903 A | * | 10/1998 | Schiller et al. ............. 280/735 |
| 5,869,745 A | * | 2/1999 | Schroeder et al. ......... 73/31.04 |
| 5,927,753 A | * | 7/1999 | Faigle et al. ................ 280/735 |
| 5,931,497 A | * | 8/1999 | Fischer .................... 280/743.1 |
| 5,957,490 A | | 9/1999 | Sinnhuber ................... 280/735 |
| 6,007,094 A | * | 12/1999 | Hosoda ....................... 280/735 |
| 6,129,379 A | * | 10/2000 | Specht ....................... 280/735 |
| 6,243,634 B1 | * | 6/2001 | Oestreicher et al. ........... 701/45 |
| 6,272,411 B1 | * | 8/2001 | Corrado et al. ............... 701/45 |
| 6,308,983 B1 | | 10/2001 | Sinnhuber ................... 280/735 |
| 6,513,831 B2 | * | 2/2003 | Stierle et al. ............... 280/735 |
| 6,536,799 B2 | * | 3/2003 | Sinnhuber et al. .......... 280/735 |
| 6,549,836 B1 | * | 4/2003 | Yeh et al. ..................... 701/45 |
| 6,557,889 B2 | * | 5/2003 | Breed ........................ 280/735 |

FOREIGN PATENT DOCUMENTS

| | | |
|---|---|---|
| DE | 19816075 | 10/1999 |
| DE | 19913095 | 10/2000 |
| EP | 0812741 | 9/1997 |
| EP | 0836971 | 4/1998 |

* cited by examiner

Primary Examiner—Michael J. Carone
Assistant Examiner—John Richardson
(74) Attorney, Agent, or Firm—Lonnie Drayer; Jarett Rieger

(57) ABSTRACT

An airbag system for a motor vehicle has an airbag that is deployed upon inflation with a gas from a folded state into the vehicle interior. An inflation device supplies gas for inflating the airbag. A sensing device senses deployment of the airbag to the effect that the temporal and spatial sequence involved in opening the folds of the airbag is detected. A control device controls the inflation process as a function of deployment sensing.

4 Claims, 5 Drawing Sheets

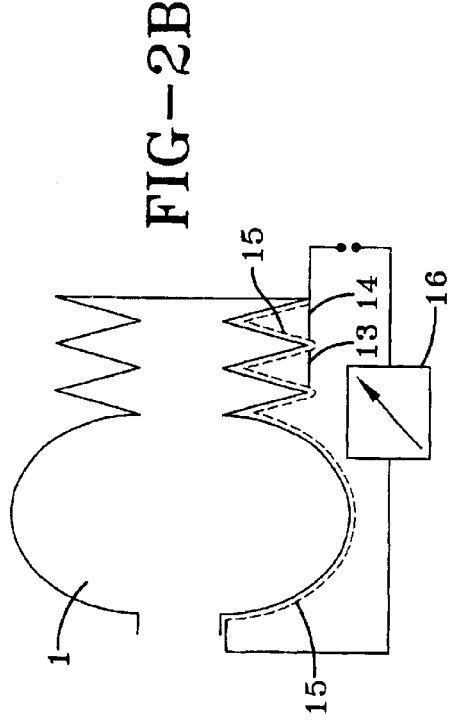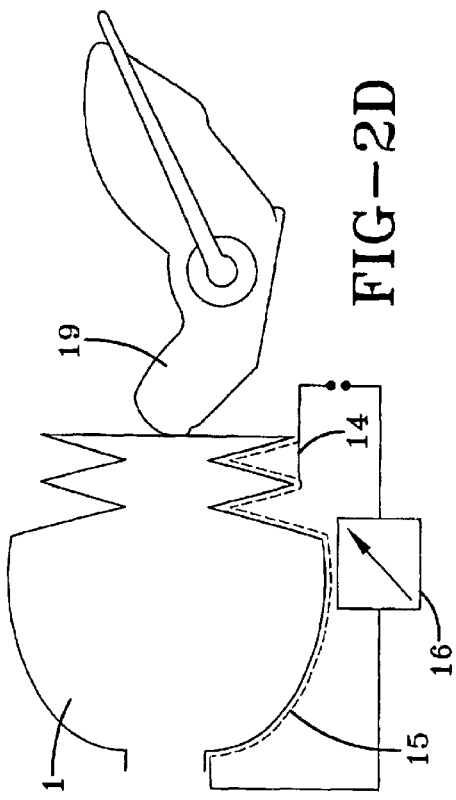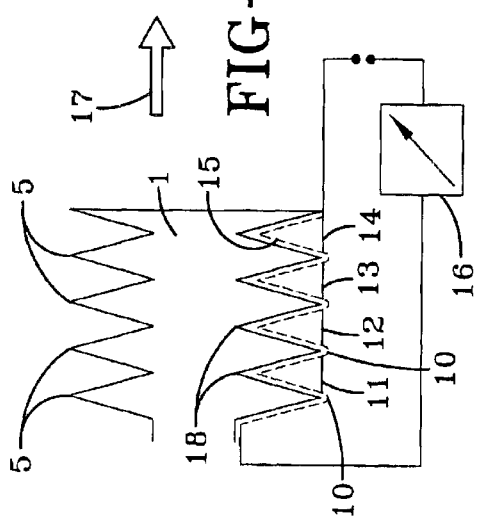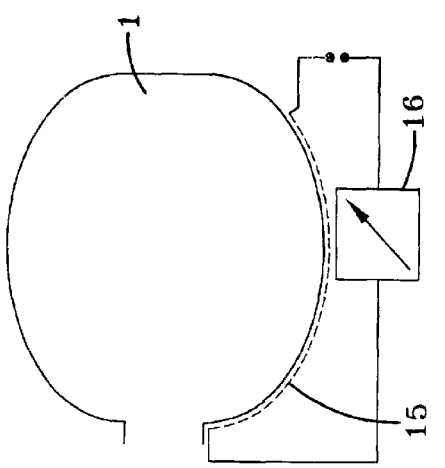

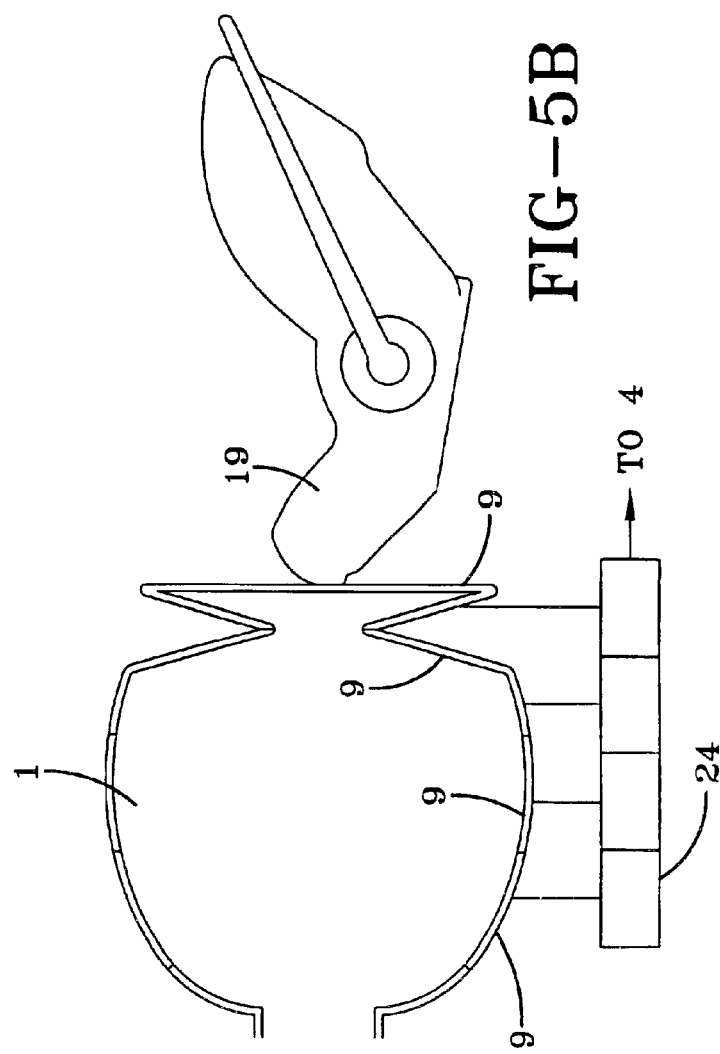
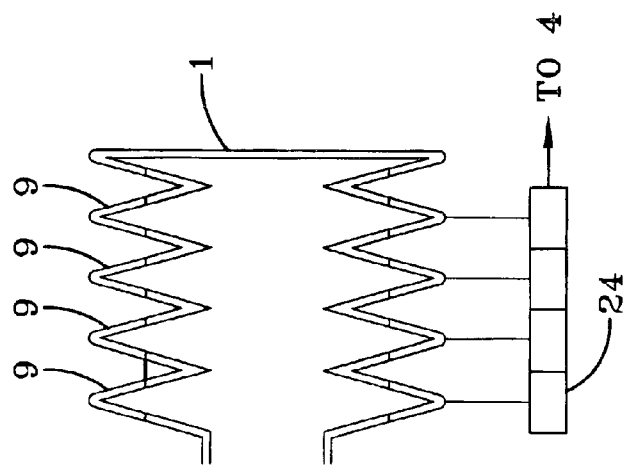

AIRBAG SYSTEM FOR A MOTOR VEHICLE

FIELD OF THE INVENTION

The invention relates to an airbag system for a motor vehicle.

DISCUSSION OF THE PRIOR ART

EP 0 812 741 A1 teaches an airbag that is deployed from a folded state into the interior of a vehicle upon inflation with a gas supplied by an inflator. Deployment of the airbag is sensed using a sensing device and the inflation process is controlled using a control device as a function of deployment sensing. To this end, in the event of a crash with an external obstacle the amount of gas fed into the airbag is controlled as a function of the sensed free path length in such a way that a reduced volume of inflation gas is introduced into the airbag.

SUMMARY OF THE INVENTION

There is provided in accordance with the present invention an airbag system for a motor vehicle comprising: a fabric airbag that is deployed upon inflation with a gas from a folded state into an interior of the vehicle; an inflation device that supplies the gas for inflating the airbag; a sensing device that senses deployment of the airbag; an electronic memory device a desired temporal and spatial deployment sequence is stored; and a control device that controls the inflation process as a function of deployment sensing, wherein the sensing device senses the temporal and spatial sequence involved in opening the folds of the airbag and compares the sensed temporal and spatial sequence to the desired temporal and spatial deployment sequence for controlling the inflation process.

The electronic memory device stores parameters that represent the unhindered temporal and spatial deployment sequence. When the deployment sequence is sensed, the sensing device supplies signals conformed to these parameters, which signals are compared with one another in the control device, which to this end comprises an appropriate comparator. Control of the deployment process then takes place as a function of the result of this comparison, wherein the amount of inflation gas supplied to the airbag may be controlled.

The measured values obtained during sensing, which represent the temporal and spatial sequence involved in unfolding the airbag folds, may for example be electrical signals for electrical resistance values. A continuous electrical conductor track may be provided on the airbag fabric, which, when the airbag is in the folded state, is short-circuited at various points, in particular at the inner and/or outer fold points of the airbag or therebetween. In the folded state a minimal electrical resistance value is present, which increases during unfolding of the airbag in accordance with the number of opened folds.

Measured values may be obtained by contactless sensing, which values represent the temporal and spatial sequence involved in opening the folds of the airbag. This may be achieved for example by one or more reflectors that are provided on the airbag.

Unfolding of the airbag may be monitored by contactless sensing, such as ultrasound, light, in particular laser, radar, infrared and other auxiliary means may be used to obtain the measured values. When detecting the reflected signals, the Doppler effect may be exploited to detect the frequency, in particular frequency variation, of the reflected signals as a measured value.

Unfolding of the airbag may be monitored by an optical fiber or an electrical conductor associated with the fabric of the airbag, wherein a signal is transmitted through this conductor during the inflation process, which signal is received at the end of the conductor. In the event of a disturbance, for example caused by a break in the conductor, the signal is absent and the gas flow is corrected, for example interrupted or stopped, as a function thereof.

Unfolding of the airbag may be monitored by pressure chambers, which are arranged on the outside of the airbag. By measuring the pressure in the respective chambers, information is obtained about the unfolding of the airbag.

BRIEF DISCUSSION OF THE DRAWINGS

FIGS. 2A–2D show a first embodiment of a sensing device, which may be used in the airbag system of FIG. 1.

FIGS. 5A and 5B show a fourth embodiment of the sensing device, which may be used in the airbag system of FIG. 1.

DETAILED DESCRIPTION OF THE INVENTION

Figure 1:
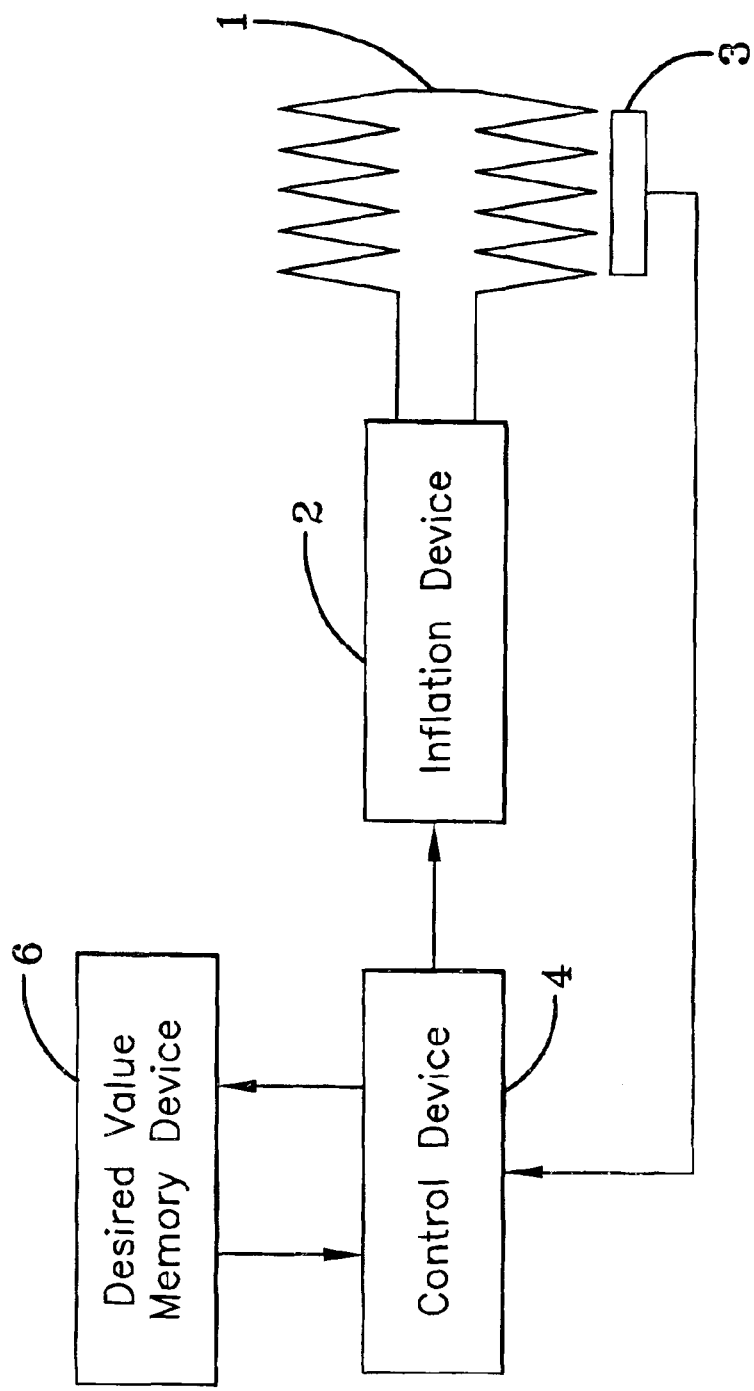
FIG. 1 is a block diagram of an exemplary embodiment of an airbag system according to the present invention.

In FIG. 1 is a schematic of an exemplary airbag system according to the invention that comprises an inflation device 2 for inflating an airbag 1 with an inflation gas. The inflation device 2 may take the form of a gas generator that generates the inflation gas in response to a sensor signal. However, the inflation device 2 may alternatively comprise a gas storage tank, in which the inflation gas, especially inert gas, for example a noble gas such as helium is kept under pressure in readiness for the inflation process. The gas storage tank is opened for inflating the airbag 1 in response to a sensor.

The airbag system has a sensing device 3, which senses deployment of the airbag 1 during inflation and unfolding of the airbag. The sensing device operates in contactless manner or with particular electrical contact. Various embodiments of the sensing device are shown in FIGS. 2A to 5B and described in the following text.

The sensing device 3 generates electrical measuring signals, which represent the temporal and spatial sequence involved in deploying the airbag, which is folded when in a rest state during normal vehicle operation. The measuring signals are supplied to a control device 4, which controls the inflation process as a function of the measuring signals supplied. A memory device 6 may be connected with the control device 4, which memory device comprises parameters stored in electronic form. These parameters represent the unhindered, correct temporal and spatial sequence involved in opening or unfolding of the folds 5 of the airbag 1. In the rest state the airbag 1 is accommodated in a housing provided in the vehicle in folds stacked in a defined manner with respect to dimensions and positions. In the event of correct, undisturbed unfolding, the measured values supplied by the sensing device 3 correspond with the stored parameters in the memory device. These stored parameters represent desired values for the temporal and spatial sequence involved in opening the folds of the airbag. The measured values from the sensing device 3 and the stored values are compared with one another in the control device 4. The inflation device 2 is then controlled during inflation of the airbag 1 as a function of the result of this comparison. Control of the inflation process may however also proceed directly as a function of the respective measuring signal, in particular the quantitative value of the measuring signal.

The desired values stored in the memory device 6 for the correct temporal and spatial unfolding sequence are adapted to different airbag types and represent correct and unhindered unfolding of the airbag.

FIGS. 2A–2D show a first embodiment of the sensing device 3. In FIG. 2A the airbag 1 is in its folded state under normal operating conditions of the vehicle. This folded state is illustrated schematically. In this state, the airbag is disposed in a particular arrangement of successive flat-stacked folds 5. A continuous electrical conductor in the form of an elongate electrical resistor track 15 is located on the fabric of the airbag 1. The track 15 extends on the airbag 1 in the deployment direction 17. In the exemplary embodiment illustrated, jumpers, or shorting bars, 11–14 are provided at fold creases 10, by which the lengths of resistor track 15 between successive folds 5 are short-circuited. The jumpers 11–14 may be provided at any desired points of successive folds, i.e. also between the outer fold creases 10 and inner fold creases 18. This ensures that the electrical resistance of the resistor track exhibits a minimum value from the one end thereof to the other end thereof when the airbag 1 is in the folded state. If, in a crash for example, the inflation device 2, triggered by a sensor which is not described in any more detail, inflates the airbag 1, the fabric of the airbag 1 moves from the rest position in which it is folded as shown in FIG. 2A in the deployment direction 17 into the interior of the vehicle. After a period of approximately 20 ms, one or more of the folds 5 will have been opened, wherein the jumpers, which connected these folds together, will have been severed. In this area, the resistor track 15 exhibits its full electrical resistance value, minus the remaining short-circuited resistor track parts.

In FIG. 2B the remaining jumpers 13, 14 are still present for explanatory purposes. The areas of the resistor track 15 located therebetween do not therefore contribute to the resistance value, which is measured in a resistance measuring device 16. From this it is clear that a change in the resistance value of the resistor track 15 measured by the measuring device 16 is produced by the temporal and spatial sequence involved in opening or unfolding the folds 5. The resistance value measured in each case provides information as to how far the fold sequence of the airbag 1 has already been opened and is still folded.

Instead of one resistor track 15, it is also possible to provide a plurality of resistor tracks that extend substantially along the folds 5 in the deployment direction 17 on the fabric of the airbag 1. The sequence involved in opening the individual folds may be detected over the entire airbag 1 by corresponding resistance measurements at the respective resistor tracks.

In the event of correct and unhindered inflation of the airbag 1, said airbag 1 assumes its completely inflated state, shown schematically in FIG. 2C after a certain period, which may amount to approximately 25 ms. In this state, all of the jumpers 11–14 which had been provided on the fabric of the airbag 1 between successive folds 5 have been broken. The total resistance value of the elongate resistor track 15 is then indicated by the resistance measuring device 16.

If deployment of the airbag 1 is affected by an obstacle 19, for example a child seat, or by out-of-position vehicle occupants, i.e. by an external obstacle located in the interior of the vehicle, one or more folds 5 of the airbag 1 may be prevented from opening or unfolding depending on the position of the external obstacle 19, as is shown schematically in FIG. 2D. The jumpers between the unopened folds 5 remain intact. In FIG. 2D it is jumper 14 that remains. The resistance value of the resistor track 15 remaining between the unopened folds 5 is not detected by the measuring device 16. The resistance measuring device 16 indicates only the resistance value exhibited by the resistor track 15 between the opened folds. By effecting a comparison with resistance values stored in the memory device 6 for a given time sequence, it is established in the control device 4 that an external obstacle 19 is located in the deployment path of the airbag 1 and the inflation device 2 is appropriately actuated. To this end, for example, a reduced inflation gas volume may be introduced into the airbag or gas inflow into the airbag may be interrupted or stopped.

In the exemplary embodiment illustrated in FIGS. 2A–2D, the resistance value of the resistor track 15 is measured, wherein the resistance value between the end adjacent the inflation device and the end adjacent the front side of the airbag 1 is measured.

Figure 4A:
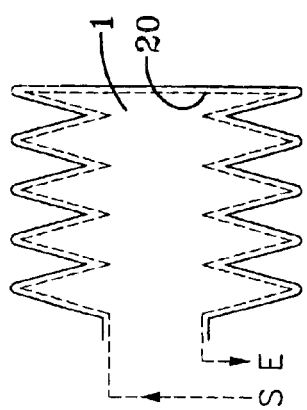
FIGS. 4A–4C show a third embodiment of a sensing device that may be used in the airbag system of FIG. 1.
Figure 4C:
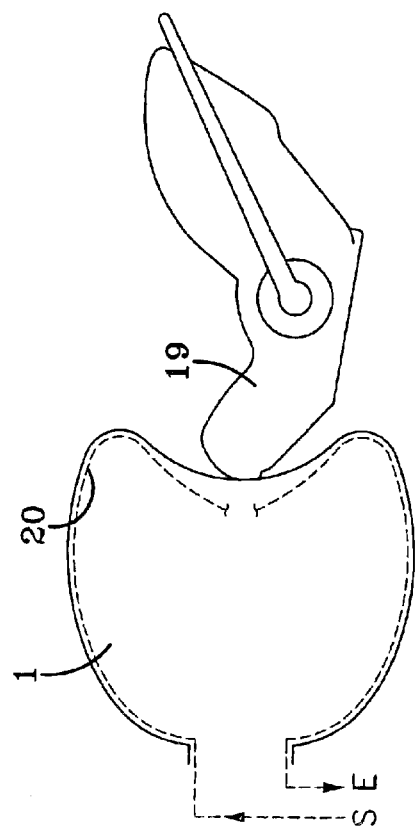
Figure 4B:
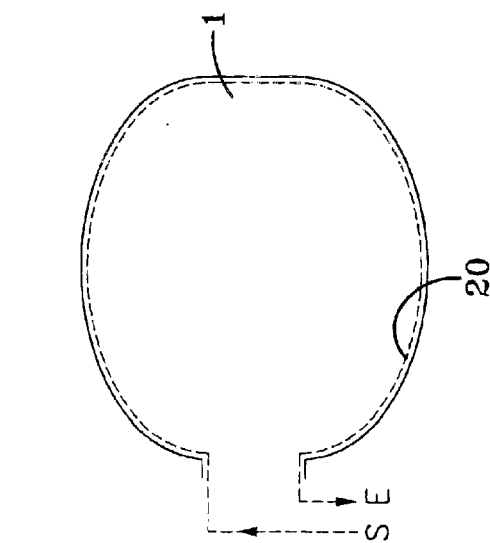

In the exemplary embodiment illustrated in FIGS. 4A–4C a conductor 20 is used, which may take the form of an optical fiber or an electrical conductor. The conductor 20 extends from the end of the airbag 1 adjacent the inflation device 2 over the entire length of the airbag to the front side and back to the end of the airbag adjacent the inflation device. At the ends in the area of the inflation mouth of the airbag 1 there are located a signal emitter S and a signal receiver E, which establish whether or not there is light or current flowing through the conductor 20 during unfolding of the airbag. Instead of a conductor 20, a plurality of conductors may also be used which are distributed over the entire circumference of the airbag 1. In the case of an optical fiber, a signal emitter, for example a laser diode, is provided at one conductor end and a light receiver at the other end. If the airbag 1 unfolds in an unhindered and correct manner, the signal transmitted by the signal emitter S is received by the signal receiver E. In its final position, the airbag 1 then arrives in the position shown in FIG. 4B. If an external obstacle, such as the obstacle 19 in FIG. 4C, is located in the deployment path of the airbag, the conductor 20 breaks, such that the signal receiver E no longer receives a signal. This breakage is detected in the control device and the gas supply is stopped, interrupted or reduced by the inflation device.

Figure 3A:
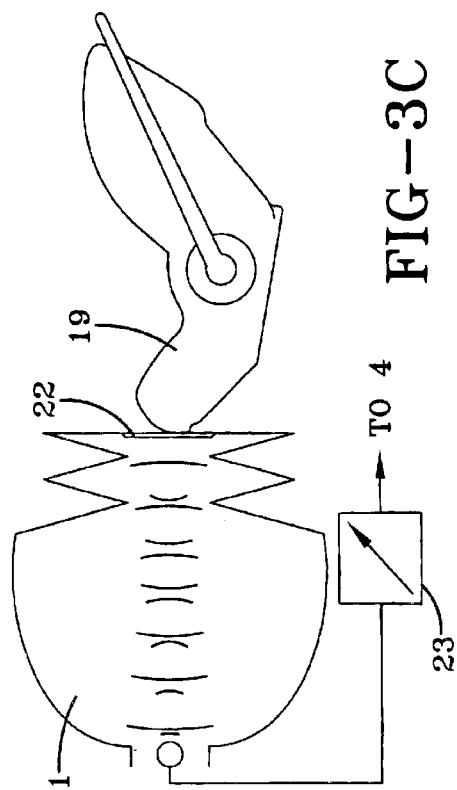
FIGS. 3A–3C show a further embodiment that may be used as a sensing device in the airbag system of FIG. 1.
Figure 3B:
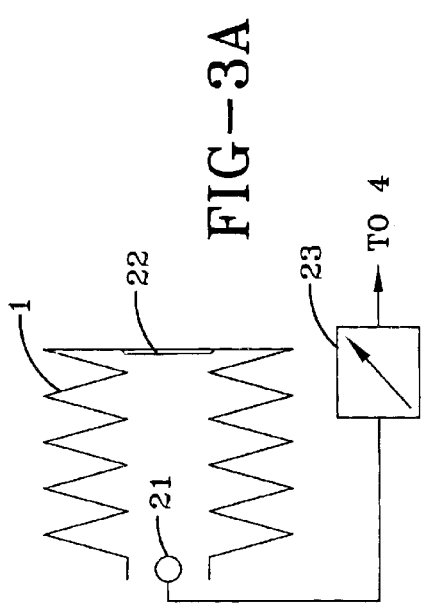
Figure 3C:
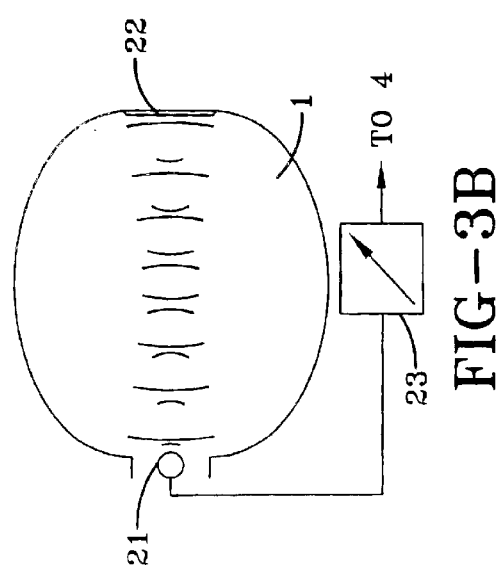

In addition, contactless sensing of the temporal and spatial sequence involved in airbag unfolding may be performed. To this end, as shown in FIGS. 3A–3C a transmitting/receiving device 21 may be provided, which radiates ultrasound, light, infrared radiation or other electromagnetic radiation into the interior of the airbag 1. Inside the airbag, a reflector 22 is preferably provided on the front of the airbag, which reflects signals transmitted by the transmitting/receiving device 21. The reflected signals are received by the transmitting/receiving device 21. The received signal may optionally be evaluated with respect to frequency variation as a result of the Doppler effect. A frequency measuring device 23 connected to the transmitting/receiving device 21 may convert the measured frequencies, in particular the variation in these frequencies per unit time, into deployment rate measuring signals by evaluation of the Doppler effect. The corresponding measuring signals are then conveyed from the sensing device, with which the transmitting/receiving device 21 and the frequency measuring device 23 are associated, to the control device 4 for controlling the inflation gas volume fed to the inside of the airbag 1. To this end, a time sequence for the frequency variations may be stored in the memory device, which sequence represents undisturbed, correct deployment of the airbag 1 from the position illustrated in FIG. 3A to that illustrated in FIG. 3B. This frequency variation time sequence is compared with the measured values supplied by the sensing device. If, as is shown schematically in FIG. 3C, an external obstacle 19 is located in the deployment path of the airbag, no variation in the frequency of the reflected signal occurs, since the reflector 22 moves no further. The inflation device 2 may then be actuated in such a way that the gas volume supplied to the airbag 1 is reduced or stopped in accordance with the deployment already effected. It is also possible to provide a plurality of reflective surfaces 22 in the folded area of the airbag 1.

In the exemplary embodiment illustrated in FIGS. 5A and 5B, pressure chambers 9 are provided on the fabric of the airbag 1. Such pressure chambers may be produced in a single operation during production of the fabric of the airbag for example using a Jacquard loom. During inflation of the airbag, pressure development in the pressure chambers 9 may be determined by associated pressure measurements in pressure measuring devices 24 and conducted to the control device 4 where they are compared with pressure values stored in the memory device. The pressure values stored electronically in the memory device 6 correspond to a temporal and spatial sequence of the pressure values that are established in the pressure chambers 9 during correct, unhindered inflation of the airbag 1. If an obstacle is encountered during inflation from the folded state illustrated in FIG. 5A to the state of deployment hindered by an external obstacle 19, illustrated in FIG. 5B, this fact is established by appropriate pressure measurement in the relevant pressure chambers 9. The sensing device 3, with which the pressure measuring device for the respective chambers 9 is associated, supplies corresponding measuring signals to the control device 4, which establishes the deviation from the desired values of the memory device 6 and actuates the inflation device 2 accordingly. In this way, the gas flow to the interior of the airbag is adjusted accordingly.

While representative embodiments of the invention have been shown and described it will be apparent to one skilled in the art that changes and modifications may be made therein without varying from the scope of the invention. Said scope is intended to be interpreted in accordance with the claims set forth below.

We claim:

1. An airbag system for a motor vehicle comprising:

a fabric airbag that is deployed upon inflation with a gas from a folded state into an interior of the vehicle, wherein at least one electrical conductor is disposed completely on an outside of the fabric airbag, wherein passage of an electrical signal through the entire length of the electrical conductor is monitored by a sensing device;

an inflation device that supplies the gas for inflating the airbag;

an electronic memory device for storing a desired temporal and spatial deployment sequence; and a control device that controls the inflation process as a function of deployment sensing, wherein the sensing device senses the temporal and spatial sequence involved in opening the folds of the airbag and compares the sensed temporal and spatial sequence to the desired temporal and spatial deployment sequence for controlling the inflation process.

2. The airbag system according to claim 1 wherein the electrical conductor is in the form of an elongate electrical track.

3. The airbag system according to claim 1 wherein further comprising jumpers disposed between successive folds of the fabric airbag whereby each jumper is connected on both ends to the electrical conductor, wherein each jumper short circuits a portion of the electrical conductor.

4. The airbag system according to claim 1 wherein the jumpers are disposed on the outside of the fabric airbag whereby the jumpers successively broken as the airbag deploys.

* * * * *